(12) United States Patent
Yim et al.

(10) Patent No.: US 8,127,110 B2
(45) Date of Patent: Feb. 28, 2012

(54) METHOD, SYSTEM, AND MEDIUM FOR PROVIDING INTERPROCESSOR DATA COMMUNICATION

(75) Inventors: Keun Soo Yim, Yongin-si (KR); Jeong Joon Yoo, Yongin-si (KR); Jung Keun Park, Seoul (KR); Chae Seok Im, Seoul (KR); Jan Don Lee, Paju-si (KR); Woon Gee Kim, Suwon-si (KR); Seung Hyun Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1443 days.

(21) Appl. No.: 11/654,011

(22) Filed: Jan. 17, 2007

(65) Prior Publication Data
US 2007/0198879 A1 Aug. 23, 2007

(30) Foreign Application Priority Data
Feb. 8, 2006 (KR) ........................ 10-2006-0012227

(51) Int. Cl.
*G06F 9/26* (2006.01)
(52) U.S. Cl. ........ 711/220; 710/100; 713/310; 711/202; 711/203; 711/212; 711/221
(58) Field of Classification Search .................. 710/100; 711/202, 203, 220; 341/50
See application file for complete search history.

(56) References Cited

U.S. PATENT DOCUMENTS

| | | | | |
|---|---|---|---|---|
| 6,069,999 A * | 5/2000 | Gabor | ......................... | 358/1.11 |
| 6,215,904 B1 * | 4/2001 | Lavallee | ....................... | 382/234 |
| 6,308,147 B1 * | 10/2001 | Keaveny | ......................... | 703/25 |
| 6,691,305 B1 * | 2/2004 | Henkel et al. | .................. | 717/136 |
| 6,741,190 B2 * | 5/2004 | Henkel et al. | .................... | 341/50 |
| 6,742,097 B2 * | 5/2004 | Woo et al. | ...................... | 711/170 |
| 6,813,700 B2 * | 11/2004 | Fallah et al. | .................. | 711/220 |
| 6,834,335 B2 * | 12/2004 | Fallah et al. | .................. | 711/220 |
| 7,558,938 B2 * | 7/2009 | Croxford | ...................... | 711/202 |
| 7,698,512 B2 * | 4/2010 | Magklis et al. | ............... | 711/154 |
| 2002/0019896 A1 * | 2/2002 | Fornaciari et al. | ............ | 710/100 |
| 2006/0184595 A1 * | 8/2006 | Tschanz et al. | ............... | 708/200 |
| 2007/0260844 A1 * | 11/2007 | Croxford | ...................... | 711/203 |

OTHER PUBLICATIONS

Wei-Chung Cheng and Massoud Pedram, "Memory Bus Encoding for Low Power: A Tutorial"—University of Souther California Department of EE-Systems, Dated 2001—14 pages.*
ESTImedia, "Embedded Systems for Real-Time Multimedia"—Oct. 3-4, 2003—170 pages.*
Syed Saif Abrar, "High Performance Multiprocessor Architecture Design Methodology for Application-Specific Embedded Systems"—S. Sahni et al. (Eds.) HiPC 2002, LNCS 2552, pp. 102-111, 2002.*
Wei-Chung Cheng and Massoud Pedram, "Low Power Techniques for Address Encodign and Memory Allocation"—University of Souther California Department of EE-Systems, No Date Provided—6 pages.*

(Continued)

*Primary Examiner* — Brian Misiura
(74) *Attorney, Agent, or Firm* — Staas & Halsey LLP

(57) ABSTRACT

A method of transmitting data between processors, including: establishing and storing an encoding method for each area of virtual address space of a first processor in a predetermined storage device; determining an area of virtual address space corresponding to data to be transmitted to a second processor; and determining the encoding method corresponding to the determined area of the virtual address space with reference to the storage device and transmitting the data to the second processor by using the determined encoding method.

18 Claims, 10 Drawing Sheets

OTHER PUBLICATIONS

Wayne Wolf, Ahmed Amine Jerraya, and Grant Martin, "Multiprocessor System-on-Chip (MPSoC) Technology"—IEEE Transactions on Computer-Aided Design of Integrated Circuits and Systems, vol. 27, No. 10, Oct. 2008; pp. 1701-1713.*

Youngsoo Shin, Soo-lk Chae, and Kiyoung Choi, "Partial Bus-Invert Coding for Power Optimization of System Level Bus"—School of Electrical Engineering, Seoul National University; No Date Provided—3 pages.*

William Fornaciari, M. Polentarutti, Donatella Sciuto, and Cristina Silvano—"Power Optimization of System-Level Address Buses based on Software Profiling"; Dated 2003—5 pages.*

Ching-Long Su, Chi-Ying Tsui, and Alvin M. Despain—"Saving Power in the Control Path of Embedded Processors"—University of Southern California; IEEE Design & Test of Computers; Dated 1994—pp. 24-30.*

M. R. Stan and W. P. Burleson, "Bus-Invert Coding for Low-Power I/O," IEEE Transactions on Very Large Scale Integration Systems, vol. 3, No. 1, pp. 49-58, Mar. 1995.*

Luca Benini, Giovanni De Micheli, Enrico Macii, Donatella Sciuto, and Cristina Silvano, "Asymptotic Zero-Transition Activity Encoding for Address Busses in Low-Power Microprocessor-Based Systems"—IEEE 2007; pp. 77-82.*

* cited by examiner

METHOD, SYSTEM, AND MEDIUM FOR PROVIDING INTERPROCESSOR DATA COMMUNICATION

CROSS-REFERENCE TO RELATED APPLICATIONS

This application claims the benefit of Korean Patent Application No. 10-2006-0012227, filed on Feb. 8, 2006, in the Korean Intellectual Property Office, the disclosure of which is incorporated herein by reference.

BACKGROUND OF THE INVENTION

1. Field of the Invention

The present invention relates to a method, system, and medium for transmitting data from a chip or board including a plurality of processors, and more particularly, to a data transmission method, system, and medium in which data is transmitted by changing an encoding method according to a property of transmitted data or whether a processor supports a virtual memory, for each processor, thereby maximizing efficiency of data transmission and minimizing energy consumption to provide a stable chip.

2. Description of the Related Art

Nowadays, according to a development of a computing technology for processing multimedia data, a Multi-Processor System on Chip (MPSoC) including a plurality of processors supporting various functions and processing multimedia data is developed.

However, since the MPSoC includes various processors such as an Application Processor (AP), a Digital Signal Processor, and the processors are connected via a high-speed network to communicate data with each other, if an amount of data communicated between the processors is increased, the MPSoC becomes overheated and malfunctions to cause a serious damage of an entire system including the MPSoC. Particularly, since a power consumption of a bus communicating data causes approximately 70% of a power consumption amount of an entire MPSoC, it is required to reduce the power consumption of the bus.

To solve the described problem, various encoding methods capable of reducing a number of transitions of binary data transmitted to the bus communicating data are developed. The encoding methods include a bus invert coding method, an M-bit invert coding method, a gray coding method, and a TO coding method.

However, since a property for each processor or a type of transmitted data is not distinguished and an encoding method is consistently applied in a conventional MPSoC, an efficiency of data transmission is decreased and a power consumption is too great to largely alleviate malfunctioning of the MPSoC.

Accordingly, a data transmission method and system is required, capable of solving the problem of a conventional technology to maximize the data transmission efficiency and minimize the power consumption of a bus to reduce heat generated from the MPSoC, thereby preventing a malfunction of an entire system.

SUMMARY OF THE INVENTION

Additional aspects, features, and/or advantages of the invention will be set forth in part in the description which follows and, in part, will be apparent from the description, or may be learned by practice of the invention.

An aspect of the present invention provides a method and system for transmitting data between processors, in which data is transmitted by applying an optimized encoding method to maximize data transmission efficiency, and minimize power consumption of a bus to stably embody an entire system.

An aspect of the present invention also provides a method, system, and medium for transmitting data between processors, in which, since a physical address corresponding to a virtual address and a relevant encoding method may be determined at the same time, an additional operation of determining the encoding method corresponding to the virtual address is omitted, thereby minimizing usage of additional hardware, as well as determining the encoding method that can be used in transmitting data between processors at high processing speed.

An aspect of the present invention also provides a method, system, and medium for transmitting data between processors, in which, since data is transmitted by applying an optimized encoding method for each area of a physical address space though a processor does not support a virtual memory, data transmission efficiency is maximized and power consumption of a bus is minimized, thereby stably embodying an entire system.

An aspect of the present invention also provides a method, system, and medium for transmitting data between processors, in which, since data is transmitted by applying an optimized encoding method for each of a plurality of processors, data transmission efficiency is maximized and power consumption of a bus is minimized, thereby stably embodying an entire system.

According to an aspect of the present invention, there is provided a method of transmitting data between processors, including the operations of: establishing and storing an encoding method for each area of a virtual address space of a first processor in a predetermined storage device; determining an area of a virtual address space corresponding to data to be transmitted to a second processor; and determining an According to another aspect of the present invention, there is provided a method of transmitting data between processors, including: establishing and storing an encoding method for each area of a physical address space of a first processor in a predetermined storage device; determining an area of a physical address space corresponding to data to be transmitted to a second processor; and determining the encoding method corresponding to the determined area of the physical address space with reference to the storage device and transmitting the data to the second processor by using determined encoding method.

According to still another aspect of the present invention, there is provided a method of transmitting data between processors, including: establishing and storing an encoding method for each of a plurality of processors in a predetermined storage device; determining the encoding method corresponding to a first processor to which the data is transmitted, with reference to the storage device and transmitting the data to a second processor by using the determined encoding method; and transmitting information on the determined encoding method to the second processor, wherein the second processor decodes the transmitted data according to the information on the encoding method.

According to yet another aspect of the present invention, there is provided a system for transmitting data between processors, including: a storage device storing an encoding method established for each area of a virtual address space of a first processor; and a data transmission control module determining an area of a virtual address space corresponding to the data to be transmitted to a second processor, determining an encoding method corresponding to the determined area of the virtual address space with reference to the storage device, and transmitting the data to the second processor by using the determined encoding method.

According to another aspect of the present invention, there is provided a system for transmitting data between processors, including: a storage device storing an encoding method established for each area of a physical address space of a first processor; and a data transmission control module determining an area of a physical address space corresponding to the data to be transmitted to a second processor, determining an encoding method corresponding to the determined area of the physical address space with reference to the storage device, and transmitting the data to the second processor by using the determined encoding method.

According to another aspect of the present invention, there is provided a system for transmitting data between processors, including: a storage device storing an encoding method established for each of a plurality of processors in a predetermined storage device; and a data transmission control module determining an encoding method corresponding to a first processor to which the data is transmitted, with reference to the storage device, transmitting the data to a second processor by using the determined encoding method; and transmitting information on the determined encoding method to the second processor, wherein the second processor decodes the transmitted data according to the information on the encoding method.

According to another aspect of the present invention, there is provided at least one computer readable recording medium in which instructions for executing a method of transmitting data between processors is stored, the method including: establishing and storing an encoding method for each area of virtual address space of a first processor in a predetermined storage device; determining an area of virtual address space corresponding to data to be transmitted to a second processor; and determining the encoding method corresponding to the determined area of the virtual address space with reference to the storage device and transmitting the data to the second processor by using the determined encoding method.

According to another aspect of the present invention, there is provided at least one computer readable recording medium in which instructions for executing a method of transmitting data between processors is stored, the method including: establishing and storing an encoding method for each area of physical address space of a first processor in a predetermined storage device; determining an area of physical address space corresponding to data to be transmitted to a second processor; and determining the encoding method corresponding to the determined area of the physical address space with reference to the storage device and transmitting the data to the second processor by using determined encoding method.

BRIEF DESCRIPTION OF THE DRAWINGS

The above and/or other aspects, features, and advantages of the present invention will become apparent and more readily appreciated from the following description of exemplary embodiments, taken in conjunction with the accompanying drawings of which.

DETAILED DESCRIPTION OF THE PREFERRED EMBODIMENTS

Figure 1:
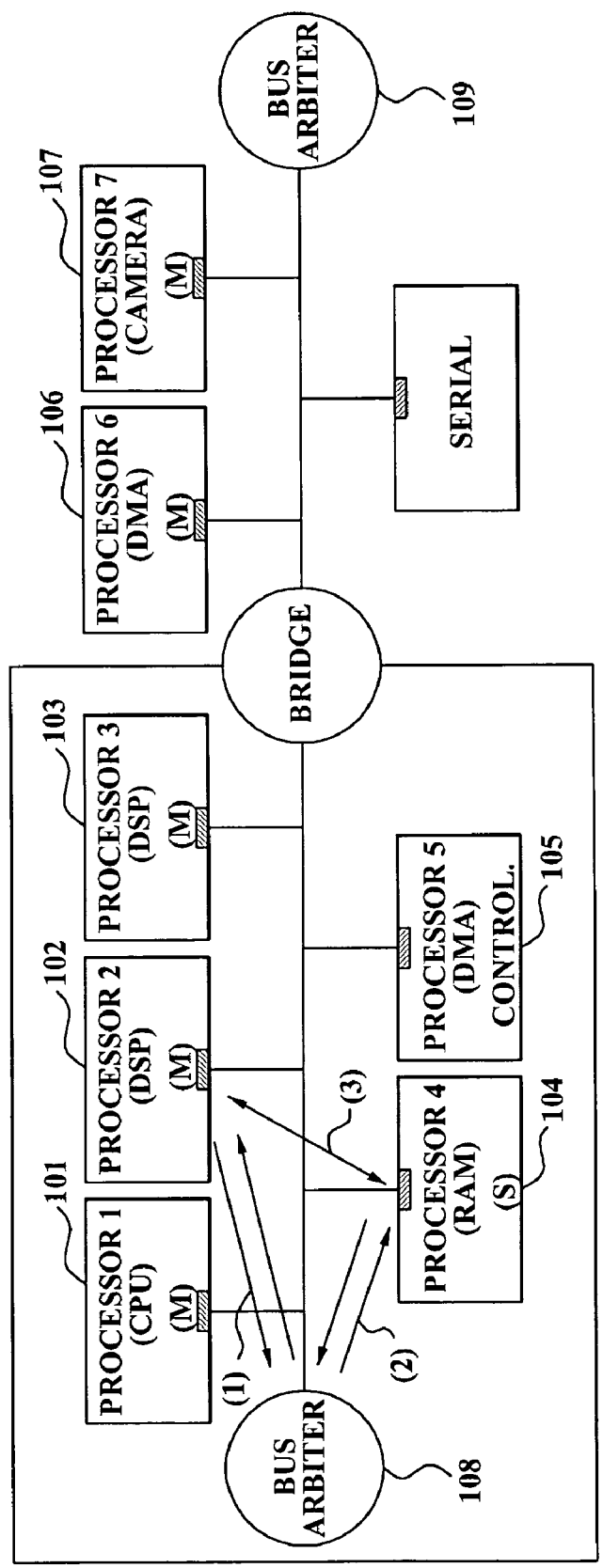
FIG. 1 is a diagram illustrating a network connection of an MPSoC according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a network connection of an MPSoC according to an exemplary embodiment of the present invention. Referring to FIG. 1, a plurality of processors 101, 102, 103, 104, and 105 included in the MPSoC or a plurality of processors 106 and 107 coupled with the MPSoC are connected via a bus that is a high-speed network. In this case, bus arbiters 108 and 109 arbitrate data communication between the processors.

A processor according to present exemplary embodiment includes all configurations processing and communicating predetermined data. Examples of the processor can be any one of the plurality of processors shown in FIG. 1. The data transmission system according to the present exemplary embodiment is included in the processor or coupled with the processor to control data communication. Also, the processor and the data transmission system may operate while being included in a predetermined chip or board.

In this case, the data transmission system according to the present exemplary embodiment may be divided and may operate as follows, according to whether the processor supports a virtual memory or a type of communication data.
(1) When the processor supports the virtual memory
(2) When the processor does not support the virtual memory
(3) When the processor is a data input/output unit Hereinafter, the operations of the data transmission system when the processor is included in any one of the three types will be described.

Figure 2:
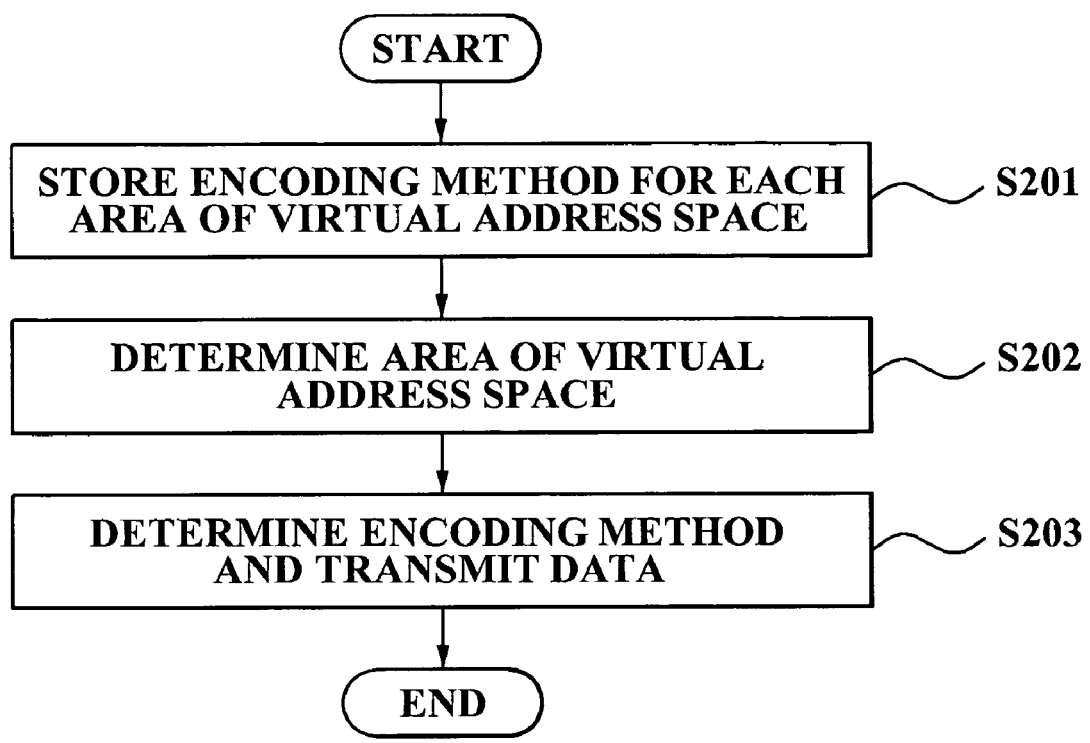
FIG. 2 is a flowchart illustrating operations of a data transmission system when a processor supports a virtual memory, according to an exemplary embodiment of the present invention.

FIG. 2 is a flowchart illustrating operations of a data transmission system when a processor supports a virtual memory, according to an exemplary embodiment of the present invention.

Referring to FIG. 2, when the processor supports the virtual memory, in operation S201, the data transmission system according to the present exemplary embodiment establishes an encoding method for each area of a virtual address space of a first processor and stores the encoding method in a predetermined storage device.

In the present exemplary embodiment, "a storage device" includes all configurations for storing data, such as a scratch-pad memory, a cache, a buffer, and a register. A "storage device" is not limited to a scratch-pad memory, a cache, a buffer, and a register and can be of other configurations.

For example, the data transmission system may store the encoding method for each area of the virtual address space in a Translation Lookaside Buffer (TLB) as the storage device.

Figure 3:
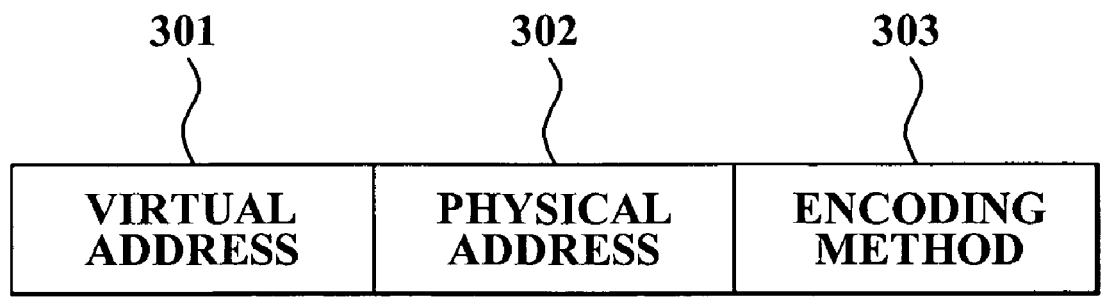
FIG. 3 is a diagram illustrating an example of a Translation Lookaside Buffer (TLB) according to an exemplary embodiment of the present invention.

FIG. 3 is a diagram illustrating an example of a Translation Lookaside Buffer (TLB) according to an exemplary embodiment of the present invention. Referring to FIG. 3, the data transmission system according to the present exemplary embodiment stores a virtual address 301, a physical address 302, and an encoding method 303 corresponding to a relevant virtual address area in a TLB of a processor. In this case, a valid bit and a dirty bit may be additionally stored in the TLB. The virtual address 301 is constructed of a Content Addressable Memory (CAM), and the physical address 302 and the encoding method 303 may be contained within Static Random-Access Memory (SRAM) or Dynamic Random Access Memory (DRAM).

In this case, the encoding method may be established by considering a type of data corresponding to a virtual address area. An optimized encoding method may be established based on a result of transmitting relevant data by using several types of encoding methods and experimentally measuring power consumption or data transmission efficiency while transmitting the data using the several types of the encoding methods.

Referring to FIG. 2, in operation S202, the data transmission system according to the present exemplary embodiment determines the area of the virtual address space, corresponding to data to be transmitted to a second processor.

In this case, since the data to be transmitted from a first processor to the second processor may be determined according to priority-based scheduling of a bus or round-robin scheduling algorithm and may be transmitted by a transaction, the data transmission system may determine the area of the virtual address space, corresponding to the data transmitted according to the scheduling.

In operation S203, the data transmission system determines the encoding method corresponding to the determined area of the virtual address area with reference to the storage device and transmits the data to the second processor by using the determined encoding method.

For example, when an encoding method corresponding to a virtual address "ADDRESS 1" is "mode 1", the data transmission system transmits relevant data to the second processor by using the encoding method "mode 1" with reference to the storage device.

In this case, the data transmission system includes a plurality of encoding circuits for supporting a plurality of encoding methods and may enable data to be transmitted by using a relevant encoding method by selecting one of the plurality of encoding circuits along with a circuit such as a multiplexer (MUX).

Thus, according to an aspect of the present invention, since data is transmitted by applying an optimized encoding method for each area of a virtual address space, there is provided an effect of stably embodying an entire system by maximizing data transmission efficiency and minimizing power consumption of a bus.

Particularly, when the storage device is the TLB, the data transmission system determines a physical address corresponding to a virtual address to transmit data and determines a relevant encoding method at the same time, thereby transmitting the data according to the determined encoding method.

In this case, when the virtual address and the encoding method information are not stored in the TLB, the data transmission system may determine the encoding method corresponding to the data with reference to additional storage devices, for example, an L2 cache or an L1 cache, determine the encoding method information by using an entry additionally patched with respect to the data, or transmit the data using a default encoding method.

Accordingly, since, in the present invention, a physical address corresponding to a virtual address is determined simultaneously with determining a relevant encoding method, an additional operation of determining the encoding method corresponding to the virtual address may be omitted, thereby determining the encoding method at a high processing speed.

Also, according to the present exemplary embodiment, information associated with the determined encoding method is transmitted to the second processor, and the second processor decodes the transmitted data according to the information associated with the encoding method.

For example, when an encoding method is "mode 1", the data transmission system may inform that the encoding method is "mode 1", by transmitting binary data "01" to the second processor.

In this case, the encoding method information formed of predetermined bits may be directly transmitted to the second processor by using an additional expanded bus as shown in (3) of FIG. 1 or may be transmitted to the second processor via a bus arbiter by using a conventional bus as shown in (1) and (2) of FIG. 1.

Figure 8:
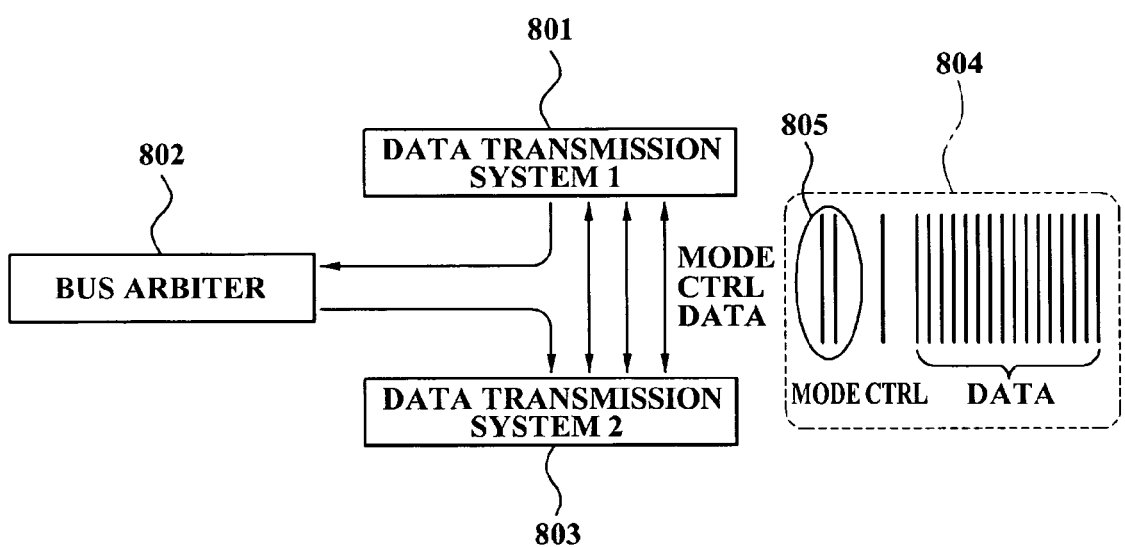
FIG. 8 is a diagram illustrating a process of transmitting encoding method information by using an expanded bus, according to an exemplary embodiment of the present invention.

FIG. 8 is a diagram illustrating a process of transmitting encoding method information by using an expanded bus 805, according to an exemplary embodiment of the present invention. Referring to FIG. 8, a data transmission system 1 801 included in a processor 1 transmits control information and data (804) to a data transmission system 2 803 included in a processor 2 by using a bus arbiter 802 transmitting control information and data, and transmits encoding method information by using an expanded bus 805. In this case, the expanded bus 805 may have a number of lines corresponding to a number of bits required in encoding method information transmission.

Figure 9:
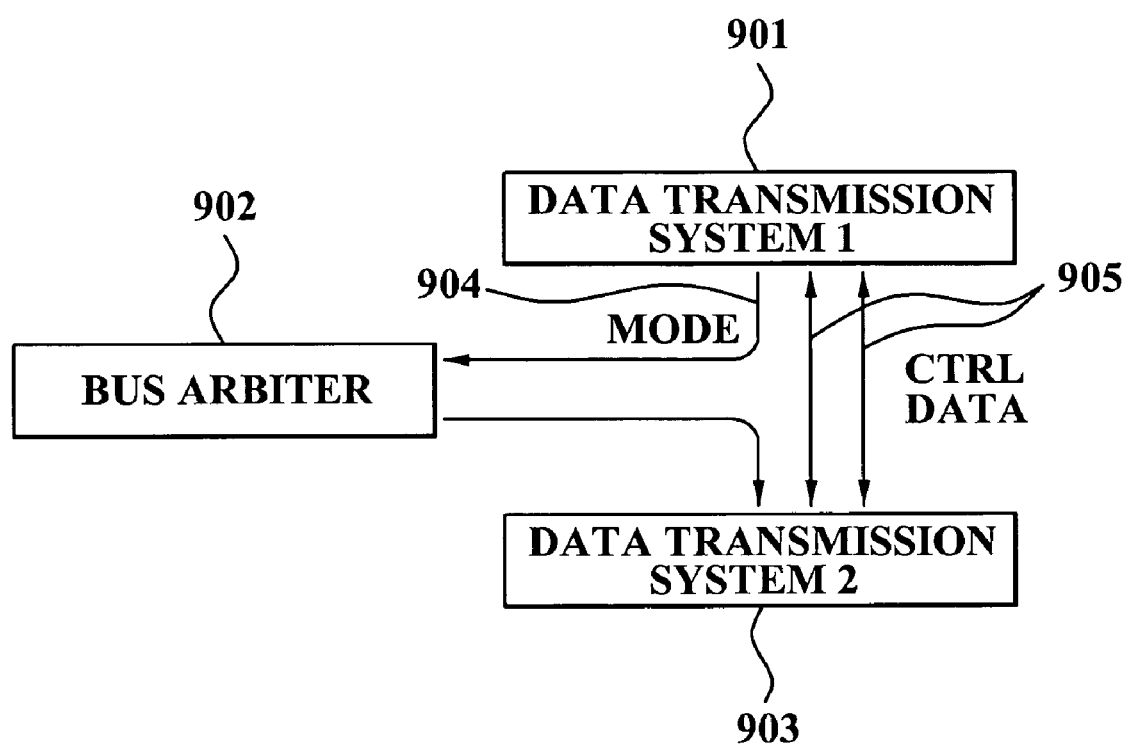
FIG. 9 is a diagram illustrating a process of transmitting encoding method information by using a conventional bus.

FIG. 9 is a diagram illustrating a process of transmitting encoding method information by using a conventional bus. Referring to FIG. 9, a data transmission system 1 901 included in a processor 1 may transmit encoding method information to a data transmission system 2 903 included in a processor 2 via a bus arbiter 902 by using a conventional bus line 904 and may transmit control information and data by using other conventional bus lines 905.

In the case of the former, there is a drawback of expanding the bus, but there is no need to modify the bus arbiter. In the case of the latter, there is no need to expand the bus, but there is a drawback of modifying the bus arbiter because the encoding method information is added to the data transmitted to the bus arbiter.

The data transmission method of FIG. 2 may be embodied via software. In this case, a data transmission process may be embodied via an operating system and an application program.

The operating system determines and stores an encoding method for each area of a virtual address space by using an applicable code and data position-related information while generating a task that is a least implementation unit having an independent address space and supports a system call function capable of enabling the encoding method to be established in the application program.

In this case, when a type of data to be transmitted is determined before performing communication between processors in the application program, information associated with the type of the data is transferred to the operation system via a system call and the operation system may establish the encoding method for each area of the virtual address space by using the information associated with the type of the data.

Next, operations of the data transmission system according to the present exemplary embodiment when a processor does not support a virtual memory will be described.

Figure 4:
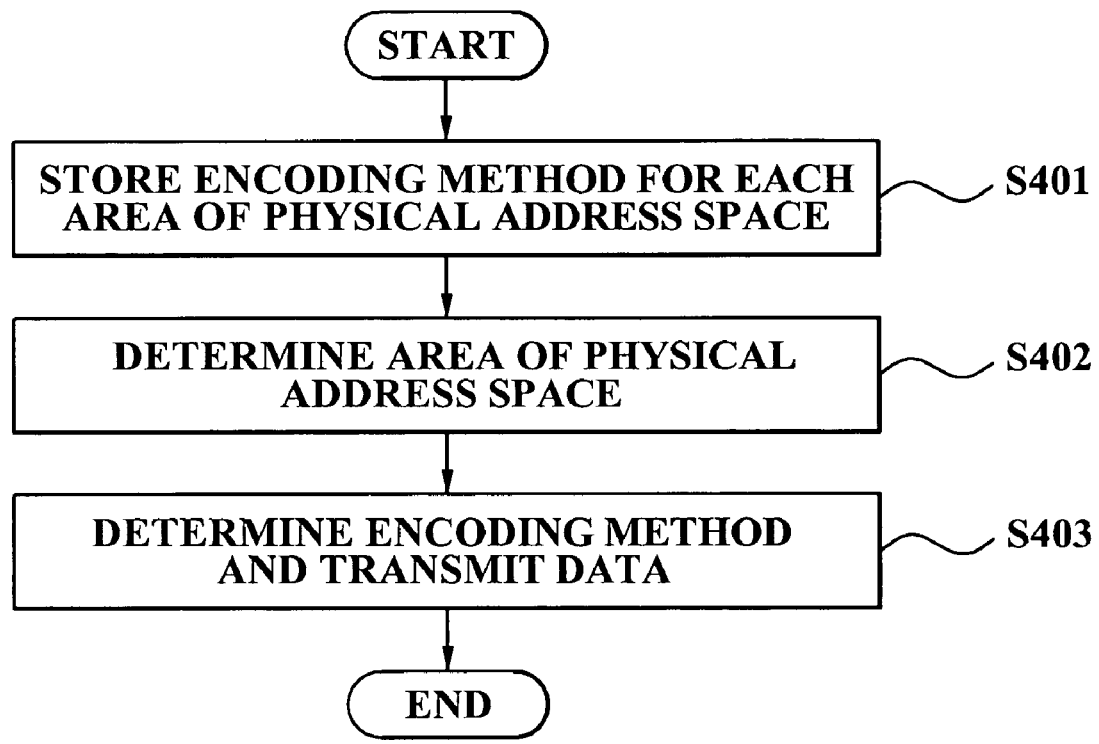
FIG. 4 is a flowchart illustrating operations of a data transmission system when a processor does not support a virtual memory, according to an exemplary embodiment of the present invention.

FIG. 4 is a flowchart illustrating operations of the data transmission system when a processor does not support a virtual memory, according to the present exemplary embodiment. Referring to FIG. 4, when the processor does not support the virtual memory, the data transmission system determines and stores an encoding method for each area of a physical address space of a first processor, in a predetermined storage device in operation 401.

Figure 5:
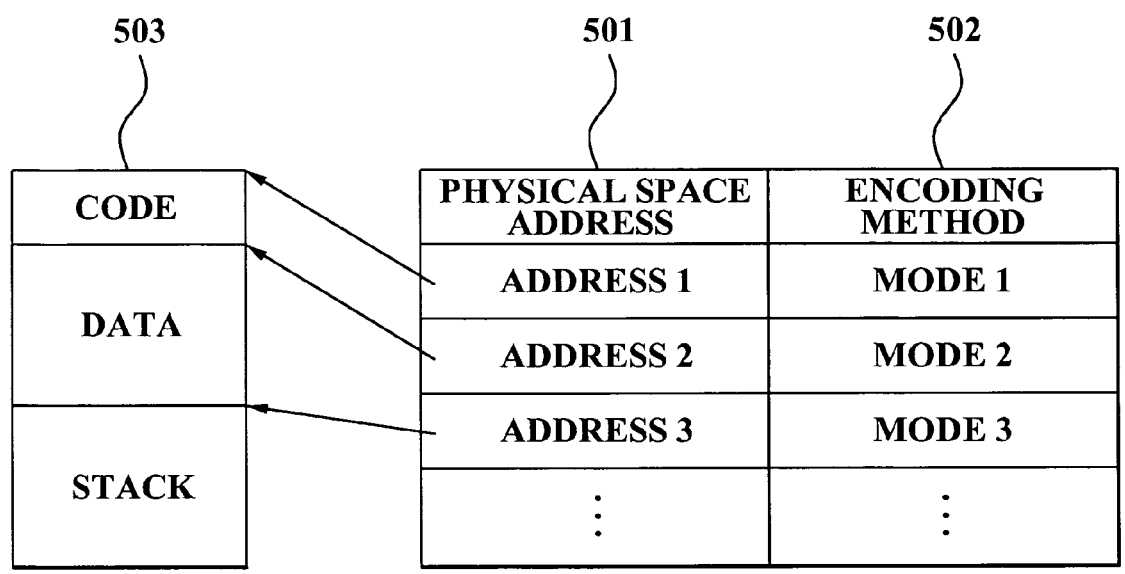
FIG. 5 is a diagram illustrating a storage device according to an exemplary embodiment of the present invention.

FIG. 5 is a diagram illustrating a storage device when a processor does not support a virtual memory, according to an exemplary embodiment of the present invention. Referring to FIG. 5, the data transmission system according the present exemplary embodiment records an encoding method for each area of a physical address space 503.

In this case, the data transmission system displays a data boundary value of the physical address space as a physical space address 501 to divide areas of the physical address space 503 and records an encoding method 502 corresponding to the each area.

The encoding method corresponding to the each area may be established by considering a type of data corresponding to a physical address space 503. An optimized encoding method may be established based on a result of transmitting relevant data by using several types of encoding methods and experimentally measuring power consumption or data transmission efficiency while transmitting the data using the several types of the encoding methods.

For example, when data is "code", "mode 1" is established as an optimized encoding method, and when data is "stack", "mode 3 is established as an optimized encoding method.

In FIG. 4, in operation 402, the data transmission system determines an area of a physical address space, corresponding to data to be transmitted to the second processor.

In this case, since the data to be transmitted from the first processor to the second processor may be transmitted by a transaction and an order of transmission between processors may be determined according to priority-based scheduling of a bus or a round robin scheduling algorithm, the data transmission system may determine the area of the physical address space, corresponding to the data transmitted according to the scheduling.

In operation 403, the data transmission system determines an encoding method corresponding to the determined area of the physical address space with reference to the storage device and transmits the data to the second processor by using the determined encoding method.

For example, when the determined encoding method is "mode 1", the data transmission system transmits the data to the second processor by using the method.

In this case, similarly, the data transmission system may include a plurality of encoding circuits for supporting a plurality of encoding methods and may enable the data to be transmitted by a relevant encoding method by selecting one of the plurality of encoding circuits along with a circuit such as a MUX.

Figure 10:
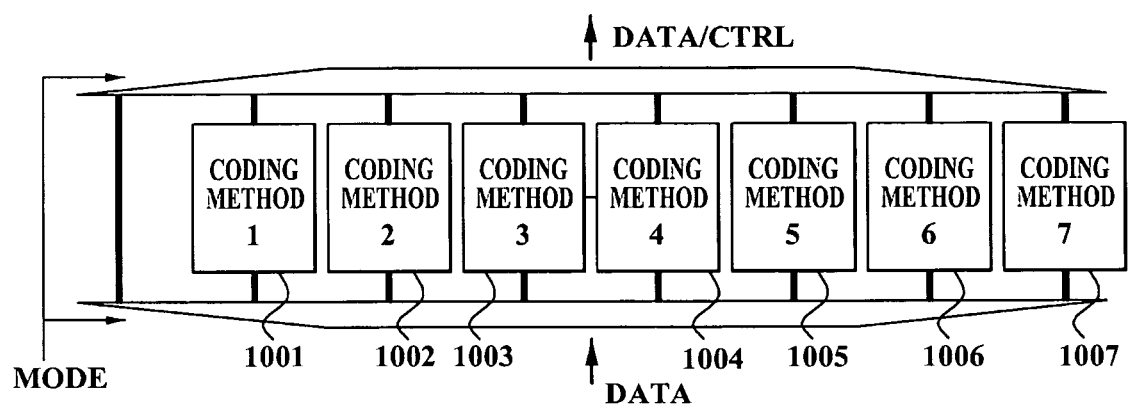
FIG. 10 is a diagram illustrating an example of a plurality of encoding circuits included in the data transmission system according to an exemplary embodiment of the present invention.

FIG. 10 is a diagram illustrating an example of a plurality of encoding circuits included in the data transmission system according to an exemplary embodiment of the present invention. Referring to FIG. 10, the data transmission system includes a plurality of encoding circuits 1001, 1002, 1003, 1004, 1005, 1006, and 1007 supporting respective encoding method, selects one of the plurality of encoding circuits, and enables data to be transmitted by using a relevant encoding method.

Also, the data transmission system transmits information associated with the determined encoding method together with the data to the second processor, and the second processor may decode the transmitted data according to the information associated with the encoding method.

In this case, encoding method information constructed by predetermined bits may be directly transmitted to the second processor by using the additional expanded bus as shown in (3) of FIG. 1 or may be transmitted to the second processor via a bus arbiter by using the conventional bus as shown in (1) and (2) of FIG. 1.

Accordingly, in the present invention, since data is transmitted by applying an optimized encoding method for each area of a physical address space though a processor does not support a virtual memory, data transmission efficiency is maximized and power consumption of a bus is minimized, thereby stably embodying an entire system.

Next, operations of the data transmission system when a processor is a data input/output unit will be described.

Figure 6:
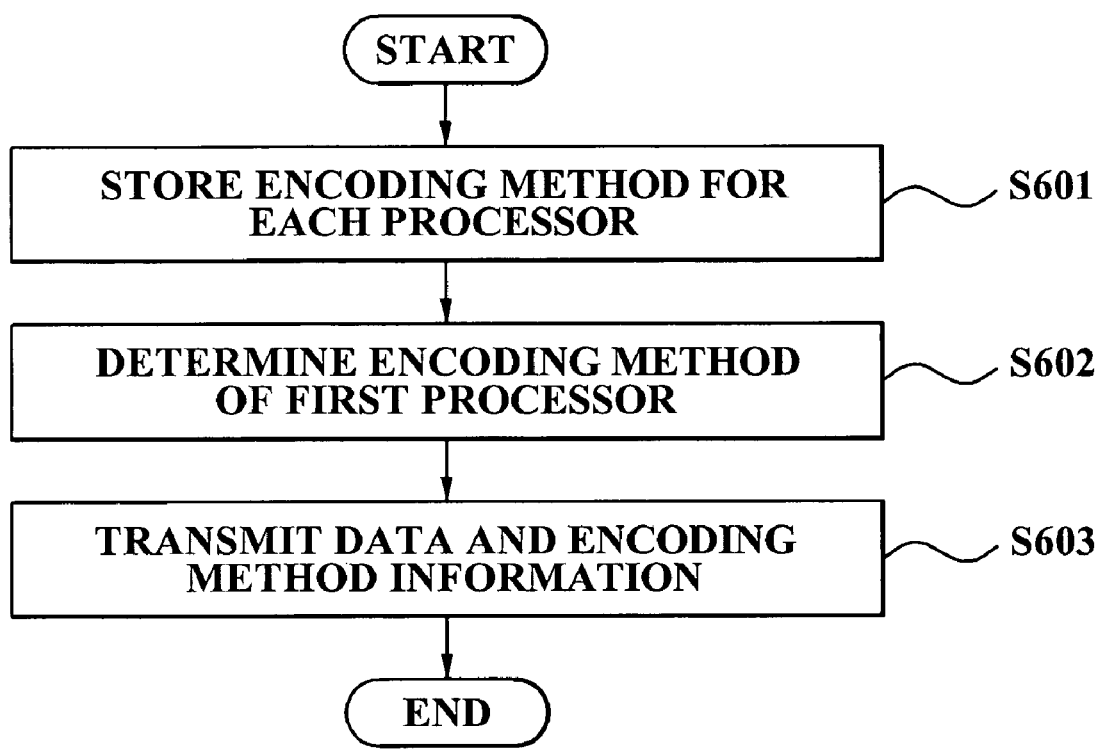
FIG. 6 is a flowchart illustrating operations of the data transmission system when a processor is a data input/output unit, according to an exemplary embodiment of the present invention.

FIG. 6 is a flowchart illustrating operations of the data transmission system when a processor is a data input/output unit, according to an exemplary embodiment of the present invention.

Referring to FIG. 6, the data transmission system establishes an encoding method for each of a plurality of processors and records the encoding method in a predetermined storage device in operation 601. In this case, the data transmission system may determine an optimized encoding method according to a type of data to be processed in the processor and may record the encoding method in the storage device, and the storage device may be a register included in the processor.

For example, when the processor is a moving picture input device such as a camera, 2-bits bus invert coding method information that is the most efficient encoding method for a register of the camera is recorded, and when the processor is an LCD, TO encoding method information that is the most efficient encoding method for a register of the LCD is stored.

In operation 602, the data transmission system determines an encoding method corresponding to a first processor to transmit data. In operation 603, the data transmission system transmits the data to a second processor by using the determined encoding method. In this case, the data transmission system transmits information associated with the determined encoding method to the second processor, and the second processor decodes the transmitted data according to the information associated with the encoding method.

Accordingly, in the present invention, since data is transmitted by applying an optimized encoding method for each of a plurality of processors, data transmission efficiency is maximized and power consumption of a bus is minimized, thereby stably embodying an entire system.

Figure 7:
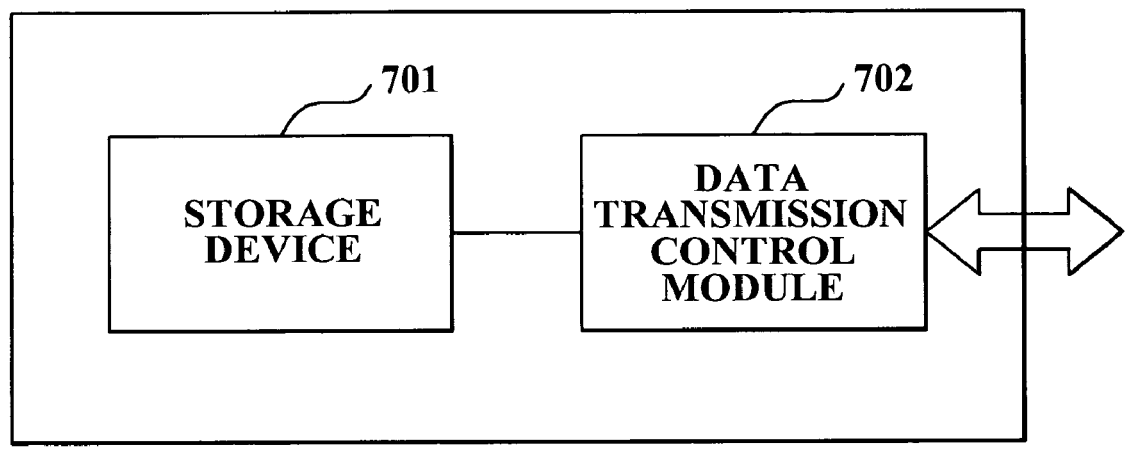
FIG. 7 is a block diagram illustrating a configuration of the data transmission system according to an exemplary embodiment of the present invention.

FIG. 7 is a block diagram illustrating a configuration of the data transmission system according to an exemplary embodiment of the present invention. Referring to FIG. 7, the data transmission system may include a storage device 701 and a data transmission control module 702.

The storage device 701 stores an encoding method established for each area of a virtual address space of a first processor. The data transmission control module 702 determines an area of a virtual address space, corresponding to data to be transmitted to a second processor, determines an encoding method corresponding to the determined area of the virtual address space with reference to the storage device 701, and transmits the data to the second processor by using the determined encoding method.

In this case, the data transmission control module 702 transmits information associated with the determined encoding method to the second processor, and the second processor may decode the transmitted data according to the information associated with the determined encoding method.

Also, for each of the exemplary embodiments, the storage device may be a TLB. The data transmission control module transmits the data by using a default encoding method when the determined encoding method corresponding to the area of the virtual address space is not determined in the TLB.

Also, the storage device 701 of a data transmission system according to another exemplary embodiment of the present invention stores an encoding method established for each area of a physical address space of a first processor. The data transmission control module 702 of the data transmission system according to another exemplary embodiment of the present invention determines an area of a physical address space, corresponding to data to be transmitted to a second processor, determines an encoding method corresponding to the determined area of the physical address space with reference to the storage device 701, and transmits the data to the second processor by using the determined encoding method.

In this case, the data transmission control module transmits information associated with the determined encoding method to the second processor, and the second processor decodes the transmitted data according to the information associated with the determined encoding method.

Also, the storage device 701 of a data transmission system according to still another exemplary embodiment of the present invention stores an encoding method for each of a plurality of processors. The data transmission control module 702 of the data transmission system according to still another exemplary embodiment of the present invention determines an encoding method corresponding to a first processor that will transmit data, with reference to the storage device 701, transmits the data to a second processor by using the determined encoding method, and transmits information associated with the determined encoding method to the second processor. The second processor decodes the transmitted data according to the information associated with the determined encoding method.

Hitherto, since technical contents and the data transmission system according to the present invention described in the previous exemplary embodiments may be applied to the data transmission system of FIG. 7 as is, a detailed description thereof will be omitted.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like, separately or cooperatively. The computer readable code/instructions and computer readable medium/media may be those specially designed and constructed for the purposes of the present invention, or they may be of the kind well-known and available to those skilled in the art of computer hardware and/or computer software. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC).

In addition, hardware devices may be configured to act as one or more software modules in order to perform the operations of the above-described exemplary embodiments.

The term "module", as used herein, can be, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and the modules can operate at least one processor (e.g. central processing unit (CPU)) provided in a device.

An aspect of the present invention provides a method, system, and medium for transmitting data between processors, in which, since a physical address corresponding to a virtual address and a relevant encoding method may be determined at the same time, an additional operation of determining the encoding method corresponding to the virtual address is omitted, thereby minimizing usage of additional hardware as well as determining the encoding method that can be used in transmitting data between processors at high processing speed.

An aspect of the present invention also provides a method, system, and medium for transmitting data between processors, in which, since data is transmitted by applying an optimized encoding method for each area of a physical address space though a processor does not support a virtual memory, data transmission efficiency is maximized and power consumption of a bus is minimized, thereby stably embodying an entire system.

An aspect of the present invention also provides a method, system, and medium for transmitting data between processors, in which, since data is transmitted by applying an optimized encoding method for each of a plurality of processors, data transmission efficiency is maximized and power consumption of a bus is minimized, thereby stably embodying an entire system.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting data between processors, comprising:
   establishing and storing an encoding method for a respective area of virtual address space of a plurality of virtual address spaces of a first processor in a predetermined storage device,
   wherein the encoding method is established for the respective area of the virtual address space by using information on a type of the data;
   determining an area of virtual address space corresponding to data to be transmitted to a second processor; and
   determining the encoding method corresponding to the determined area of the virtual address space of the first processor in the storage device and transmitting the data to the second processor by using the determined encoding method.

2. The method of claim 1, further comprising transmitting information using the determined encoding method to the second processor,
   wherein the second processor decodes the transmitted data according to the determined encoding method of the area of virtual address space.

3. A method of transmitting data between processors, comprising:
   establishing and storing an encoding method for a respective area of virtual address space of a plurality of virtual address spaces of a first processor in a predetermined storage device,
   wherein the storage device is a Translation Lookaside Buffer (TLB);
   determining an area of virtual address space corresponding to data to be transmitted to a second processor; and
   determining the encoding method corresponding to the determined area of the virtual address space of the first processor in the storage device and transmitting the data to the second processor by using the determined encoding method.

4. The method of claim 3, further comprising transmitting the data by using a default encoding method when the encoding method corresponding to the determined area of the virtual address space is not determined in the TLB.

5. A method of transmitting data between processors, comprising:
   establishing and storing an encoding method for a respective area of virtual address space of a plurality of virtual address spaces of a first processor in a predetermined storage device,
   wherein the encoding method is established and stored for the respective area of the virtual address space when generating a task of a minimum execution unit, having an independent virtual address space;
   determining an area of virtual address space corresponding to data to be transmitted to a second processor; and
   determining the encoding method corresponding to the determined area of the virtual address space of the first processor in the storage device and transmitting the data to the second processor by using the determined encoding method.

6. The method of claim 1, wherein, in the establishing and storing an encoding method for each area of a virtual address space of a first processor in a predetermined storage device, the information on the type of the data is received from an application program, and the encoding method is established for the each area of the virtual address space by using the information.

7. A method of transmitting data between processors, comprising:
   establishing and storing an encoding method for a respective area of physical address space of a plurality of physical address spaces of a first processor in a predetermined storage device;
   determining an area of physical address space corresponding to data to be transmitted to a second processor; and
   determining the encoding method corresponding to the determined area of the physical address space with reference to the storage device and transmitting the data to the second processor by using determined encoding method,
   wherein establishing the encoding method comprises establishing the encoding method for the respective area of the physical address space by using information on a type of the data.

8. The method of claim 7, further comprising transmitting information on the determined encoding method to the second processor,
   wherein the second processor decodes the transmitted data according to the determined encoding method of the area of physical address space.

9. A method of transmitting data between processors, comprising:
   establishing and storing an encoding method for a respective processor of a plurality of processors in a predetermined storage device;
   determining the encoding method corresponding to a first processor to which the data is transmitted, with reference to the storage device and transmitting the data to a second processor by using the determined encoding method; and transmitting information on the determined encoding method to the second processor,
wherein the second processor decodes the transmitted data according to the information on the encoding method,
wherein establishing the encoding method comprises establishing the encoding method for the respective area of the virtual address space by using information on a type of the data.

10. At least one computer readable recording medium in which instructions for executing a method of transmitting data between processors is stored, the method comprising:
establishing and storing an encoding method for a respective area of virtual address space of a plurality of virtual address spaces of a first processor in a predetermined storage device;
determining an area of virtual address space corresponding to data to be transmitted to a second processor; and
determining the encoding method corresponding to the determined area of the virtual address space with reference to the storage device and transmitting the data to the second processor by using the determined encoding method,
wherein establishing the encoding method comprises establishing the encoding method for the respective area of the virtual address space by using information on a type of the data.

11. A system for transmitting data between processors, comprising:
a storage device storing an encoding method established for a respective area of virtual address space of a plurality of virtual address spaces of a first processor; and
a data transmission control module determining an area of virtual address space corresponding to the data to be transmitted to a second processor, determining an encoding method corresponding to the determined area of the virtual address space with reference to the storage device, and transmitting the data to the second processor by using the determined encoding method,
wherein the encoding method is established for the respective area of the virtual address space by using information on a type of the data.

12. The system of claim 11, wherein:
the data transmission control module transmits information on the determined encoding method to the second processor; and
the second processor decodes the transmitted data according to the information on the encoding method.

13. A system for transmitting data between processors, comprising:
a storage device storing an encoding method established for a respective each area of virtual address space of a plurality of virtual address spaces of a first processor; and
a data transmission control module determining an area of virtual address space corresponding to the data to be transmitted to a second processor, determining an encoding method corresponding to the determined area of the virtual address space with reference to the storage device, and transmitting the data to the second processor by using the determined encoding method,
wherein the storage device is a TLB.

14. The system of claim 13, wherein the data transmission control module transmits the data by using a default encoding method when the encoding method corresponding to the determined area of the virtual address space is not determined in the TLB.

15. A system for transmitting data between processors, comprising:
a storage device storing an encoding method established for a respective area of physical address space of a plurality of physical address spaces of a first processor; and
a data transmission control module determining an area of physical address space corresponding to the data to be transmitted to a second processor, determining an encoding method corresponding to the determined area of the physical address space with reference to the storage device, and transmitting the data to the second processor by using the determined encoding method,
wherein the encoding method is established for the respective area of the physical address space by using information on a type of the data.

16. The system of claim 11, wherein:
the data transmission control module transmits information on the determined encoding method to the second processor; and
the second processor decodes the transmitted data according to the information on the encoding method.

17. A system for transmitting data between processors, comprising:
a storage device storing an encoding method established for a respective processor of a plurality of processors in a predetermined storage device; and
a data transmission control module determining an encoding method corresponding to a first processor to which the data is transmitted, with reference to the storage device, transmitting the data to a second processor by using the determined encoding method; and transmitting information on the determined encoding method to the second processor,
wherein the second processor decodes the transmitted data according to the information on the encoding method,
wherein the encoding method is established for the respective area of the virtual address space by using information on a type of the data.

18. At least one computer readable recording medium in which instructions for executing a method of transmitting data between processors is stored, the method comprising:
establishing and storing an encoding method for a respective area of physical address space of a plurality of physical address spaces of a first processor in a predetermined storage device;
determining an area of physical address space corresponding to data to be transmitted to a second processor; and
determining the encoding method corresponding to the determined area of the physical address space with reference to the storage device and transmitting the data to the second processor by using determined encoding method,
wherein establishing the encoding method comprises establishing the encoding method for the respective area of the physical address space by using information on a type of the data.

* * * * *

UNITED STATES PATENT AND TRADEMARK OFFICE
CERTIFICATE OF CORRECTION

| | |
|---|---|
| PATENT NO. | : 8,127,110 B2 |
| APPLICATION NO. | : 11/654011 |
| DATED | : February 28, 2012 |
| INVENTOR(S) | : Keun Soo Yim et al. |

It is certified that error appears in the above-identified patent and that said Letters Patent is hereby corrected as shown below:

Title Page Item [75] (Inventors), Line 4, Delete "Jan" and insert -- Jae --, therefor.

Title Page Column 2, Line 2, Delete "Souther" and insert -- Southern --, therefor.

Title Page Column 2, Line 11, Delete "Encodign" and insert -- Encoding --, therefor.

Title Page Column 2, Line 12, Delete "Souther" and insert -- Southern --, therefor.

Signed and Sealed this
Twenty-second Day of May, 2012

David J. Kappos
*Director of the United States Patent and Trademark Office*